(12) United States Patent
Cha

(10) Patent No.: US 10,363,967 B2
(45) Date of Patent: Jul. 30, 2019

(54) FRONT SIDE MEMBER

(71) Applicants: Hyundai Motor Company, Seoul (KR); Kia Motors Corporation, Seoul (KR)

(72) Inventor: Mun Soo Cha, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/794,937

(22) Filed: Oct. 26, 2017

(65) Prior Publication Data
US 2018/0362091 A1    Dec. 20, 2018

(30) Foreign Application Priority Data

Jun. 15, 2017  (KR) .................. 10-2017-0075893

(51) Int. Cl.
| | | |
|---|---|---|
| *B62D 21/17* | (2006.01) | |
| *B62D 25/08* | (2006.01) | |
| *F01P 11/14* | (2006.01) | |
| *F01P 11/04* | (2006.01) | |
| *B62D 29/00* | (2006.01) | |

(52) U.S. Cl.
CPC ........... *B62D 21/17* (2013.01); *B62D 25/082* (2013.01); *B62D 29/008* (2013.01); *F01P 11/04* (2013.01)

(58) Field of Classification Search
CPC .... B62D 21/17; B62D 25/082; B62D 25/084; F01P 11/14

USPC .................. 296/187.09, 203.01, 193.09, 208
See application file for complete search history.

(56) References Cited

U.S. PATENT DOCUMENTS

| | | | | |
|---|---|---|---|---|
| 3,763,950 A * | 10/1973 | Rockwell | ............... | B60K 13/06 180/309 |
| 8,454,079 B2 * | 6/2013 | Yoshida | ................... | B21D 7/08 296/187.09 |
| 8,632,108 B2 * | 1/2014 | Matuschek | ............. | B60R 19/34 293/133 |
| 8,701,811 B2 * | 4/2014 | Robinson | ............... | B60K 11/06 180/68.2 |
| 10,071,771 B2 * | 9/2018 | Maier | ................... | B62D 21/152 |
| 2005/0161267 A1 * | 7/2005 | Elson | ................... | B60K 15/063 180/65.1 |
| 2006/0071466 A1 * | 4/2006 | Rowe | ..................... | B60G 11/30 280/782 |
| 2015/0298633 A1 * | 10/2015 | Winberg | .............. | B62D 21/152 296/187.09 |
| 2016/0068193 A1 * | 3/2016 | Koike | .................. | B62D 25/082 296/187.09 |
| 2018/0170437 A1 * | 6/2018 | Park | ...................... | B62D 21/152 |

* cited by examiner

*Primary Examiner* — Gregory A Blankenship
(74) *Attorney, Agent, or Firm* — Morgan, Lewis & Bockius LLP

(57) ABSTRACT

A front side member of a vehicle includes: a front side member body disposed at right and left sides along a width direction of the vehicle while being formed to extend along a longitudinal direction of the vehicle and having a closed cross-sectional formed inside, wherein the closed cross-sectional is divided by at least one rib, and wherein two or more flow paths that are not fluidically-communicate with each other are formed, reducing a weight and a part number of the vehicle and improving a layout of the engine compartment.

10 Claims, 5 Drawing Sheets

FRONT SIDE MEMBER

CROSS-REFERENCE TO RELATED APPLICATION

The present application claims priority to Korean Patent Application No. 10-2017-0075893 filed on Jun. 15, 2017, the entire contents of which is incorporated herein for all purposes by this reference.

BACKGROUND OF THE INVENTION

Field of the Invention

The present invention relates to a front side member of a vehicle. More particularly, the present invention relates to a front side member of a vehicle configured for planning a part reduction and a layout improvement of an engine compartment by forming a flow path through a multiple closed cross-sectional in a front side member of an aluminum material to be utilized as a coolant passageway.

Description of Related Art

Generally, the front vehicle a vehicle body is a structure of frame that forms an engine compartment which is located in the front along the length direction of a vehicle and includes a front end module which is forming the front portion of engine compartment and provided with a cooling module and a head lamp, etc., a front fender apron member which is forming both the of left and right portion of engine compartment and preparing the space for wheels as well as a suspension system, a dash panel which is located in the rear of engine compartment and portions between the cabin and the engine compartment, a front side member which is extendedly formed along the longitudinal direction of a vehicle in the lower portion of engine compartment and disposed at both the left and right parts along the width direction, and a sub-frame for supporting by mounting a suspension system as well as an engine which is disposed in the engine compartment and a transmission, and the like.

In the engine compartment, parts including a power train necessary for driving the vehicle are mainly built in, in the instant case, as a high power engine having an increased size due to an increasing of the performance and the specification of the vehicle is recently disposed, it is difficult to install several parts in the engine compartment of the limited size.

That is, as shown in FIG. 1 to FIG. 3 representing one exemplary embodiment of the engine compartment according to a related art, the parts, etc required for driving the vehicle including a power train 12 are disposed inside an engine compartment 10 and a front side member 14 is disposed at right and left both sides along a width direction of the vehicle while being formed to extend in a longitudinal direction of the vehicle.

Generally, the front side member 14 is manufactured by manufacturing an internal panel and an external panel through a press method by use of a steel material and then bonding the internal panel and the external panel to each other by a method including a spot welding.

A radiator 16 is disposed at a front of the front side member 14 and an air conditioner coolant pipe 18 is positioned on the front side member 14 to extend along the longitudinal direction of the front side member 14.

However, in the conventional engine compartment layout structure as above-described, when mounting the several parts inside the engine compartment of the limited size, it is difficult to avoid an interference between the parts, for the present reason, there were many restrictions on implementing the vehicle of a high performance.

For example, in the case of the air conditioner coolant pipe 18 disposed to be extend along the longitudinal direction of the front side member 14 on the front side member 14, the air conditioner coolant pipe 18 may be separated from the side of the power train 12 by a flow gap (G)0 in minimum to avoid the interference with the power train 12, for the present reason, as the air conditioner coolant pipe 18 is disposed outside in the width direction of the vehicle, the air conditioner coolant pipe 18 is interfered with the engine mounting bracket 19 mounted on the front side member 14, accordingly, it is difficult to form the engine mounting bracket 19 with the sufficient size such that there is a concern that the engine supporting force may be deteriorated through the engine mounting bracket.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing a front side member of the vehicle configured for planning a component reduction and a layout improvement of an engine compartment by forming a flow path through a multiple closed cross-sectional divided into at least one rib inside to be utilized as a coolant passageway.

In a front side member of a vehicle having a front side member body disposed at right and left sides along a width direction of the vehicle while being formed to extend along a longitudinal direction of the vehicle and having a closed cross-sectional formed inside, wherein the closed cross-sectional is divided by at least one rib such that two or more flow paths that are not communicated with each other are formed.

The front side member body may be manufactured of an aluminum material by an extrusion method.

The front side member body may include an inside surface toward an internal to the engine compartment; an outside surface toward an outside of the engine compartment; an upper surface connecting the inside surface and the outside surface and positioned upward in a height direction; and a lower surface connecting the inside surface and the outside surface and positioned downward in the height direction thereof.

At least one rib may include a longitudinal rib connecting the upper surface and the lower surface; and a transverse rib connecting the inside surface and the outside surface.

The closed cross-sectional may be formed of a square shape.

The longitudinal rib and the transverse rib may be crossed to each other.

Four flow paths of which two or more flow paths are not communicated with each other may be formed inside the closed cross-sectional by the longitudinal rib and the transverse rib.

At least one port communicate with any one flow path among four flow paths may be formed in the inside surface.

A coolant pipe for an inflow and outflow of the coolant may be connected to at least one port.

A flange may be integrally or monolithically provided in a front portion of the coolant pipe and an assemble bolt may be inserted to the inside surface, the flange of the coolant pipe may be inserted to the assemble bolt to be assembled to the nut.

A partition limiting a flow of the coolant inflowing through the coolant pipe may be attached to the inside surface, the longitudinal rib, the upper surface, and the transverse rib at both sides of the flow path.

According to the front side member of the vehicle according to an exemplary embodiment of the present invention, the front side member is manufactured of the aluminum material by the extrusion method, reducing a weight of the vehicle and planning an enhancement of a fuel consumption.

Also, as at least one flow path divided from each other is formed inside the front side member to be utilized as the air conditioner coolant flow path, because it is not necessary to use the conventional air conditioner coolant pipe, a part number of the vehicle and the weight may be reduced.

Furthermore, as the layout of the engine compartment increases by the removal of the air conditioner coolant pipe, the parts to realize the vehicle of the high performance may be disposed inside the engine compartment.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
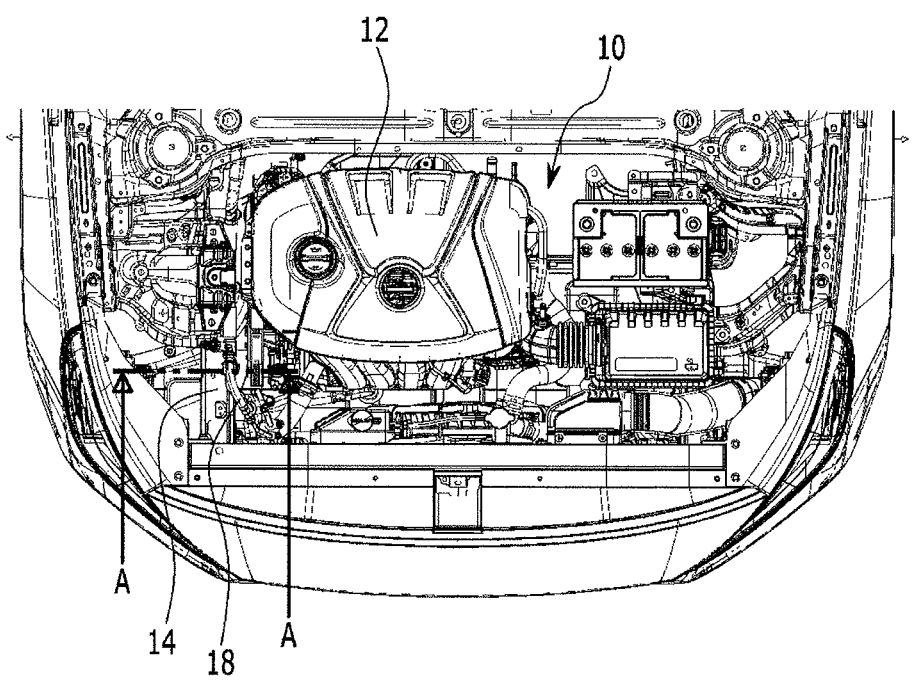
FIG. 1 is a top plan view of an engine compartment according to a related art.
Figure 2:
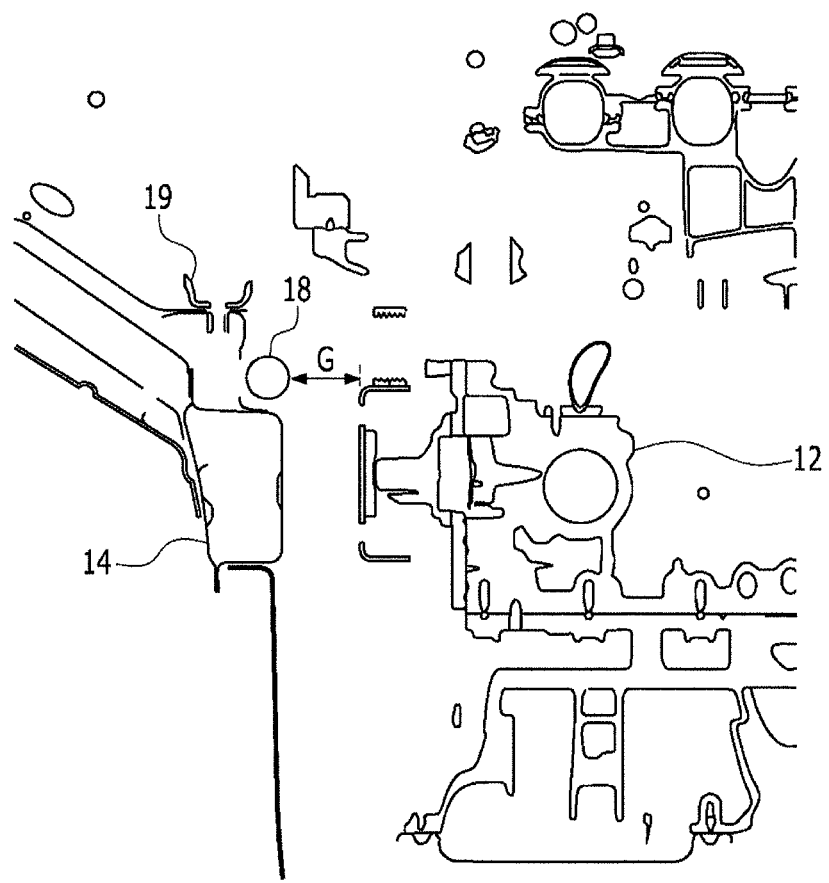
FIG. 2 is a cross-sectional view taken along a line A-A of FIG. 1.
Figure 3:
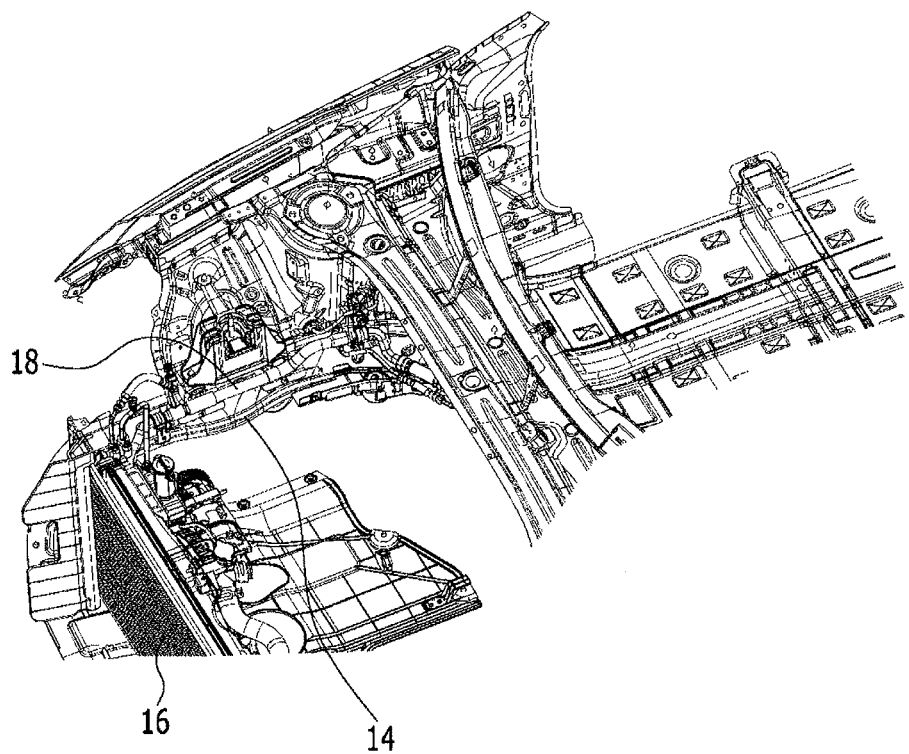
FIG. 3 is a perspective view cutting a portion of a front vehicle body according to a related art.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Figure 4:
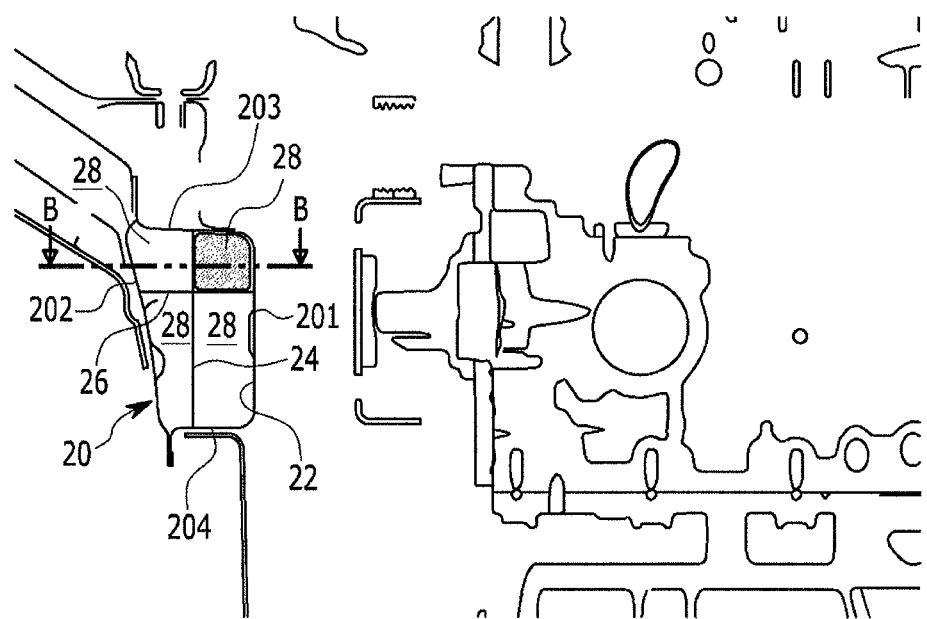
FIG. 4 is a cross-sectional view of a front vehicle body having a front side member according to an exemplary embodiment of the present invention corresponding to FIG. 2.

Referring to FIG. 4, a front side member 20 according to an exemplary embodiment of the present invention may be formed to extend along a longitudinal direction of a vehicle and may be disposed at right and left both sides according to a width direction of the vehicle.

The front side member 20 may be manufactured of an aluminum material through an extrusion method.

The front side member 20 may include a front side member body having an inside surface 201 toward an internal to the engine compartment 10, an outside surface 202 toward an outside of the engine compartment 10, an upper surface 203 connecting the inside surface and the outside surface positioned upward in a height direction, and connecting a lower surface 204 connecting the inside surface and the outside surface and positioned downward in the height direction thereof.

A power train 12 may be disposed inside the engine compartment 10.

A closed cross-sectional 22 may be formed by the inside surface 201, the outside surface 202, the upper surface 203, and the lower surface 204 inside the front side member 20.

The closed cross-sectional 22 may be formed of an approximately square shape, however any shape configured for forming the closed cross-sectional is possible.

The closed cross-sectional 22 may be formed to extend along the longitudinal direction of the vehicle.

In the closed cross-sectional 22, a longitudinal rib 24 extending in the height direction and a transverse rib 26 extending in the width direction may be integrally or monolithically provided.

The longitudinal rib 24 may connect the upper surface 203 and the lower surface 204 and the transverse rib 26 may connect the inside surface 201 and the outside surface 202.

The longitudinal rib 24 and the transverse rib 26 may be formed to be crossed to each other.

Four closed spaces may be formed by the longitudinal rib 24 and the transverse rib 26 inside the closed cross-sectional 22.

Four closed spaces are not communicating with each other by the ribs 24 and 26.

Accordingly, four closed spaces may form independent flow paths 28 that are communicated with each other.

Among four flow paths 28, two and two may be positioned upward and downward in the height direction, respectively, and two and two may be formed right and left in the width direction, respectively.

Among four flow paths 28, any one flow path 28 may be utilized as an air conditioner coolant flow path, for example.

Therefore, because the conventional air conditioner coolant pipe is not used, a part number of the vehicle and a weight thereof may be reduced and the layout of the engine compartment may be improved.

In an exemplary embodiment of the present invention, four closed space flow paths are illustrated through two ribs 24 and 26 and the closed cross-sectional 22, however it is not limited thereto and two or more closed space flow paths may be formed through an appropriate setting of the rib number.

Figure 5:
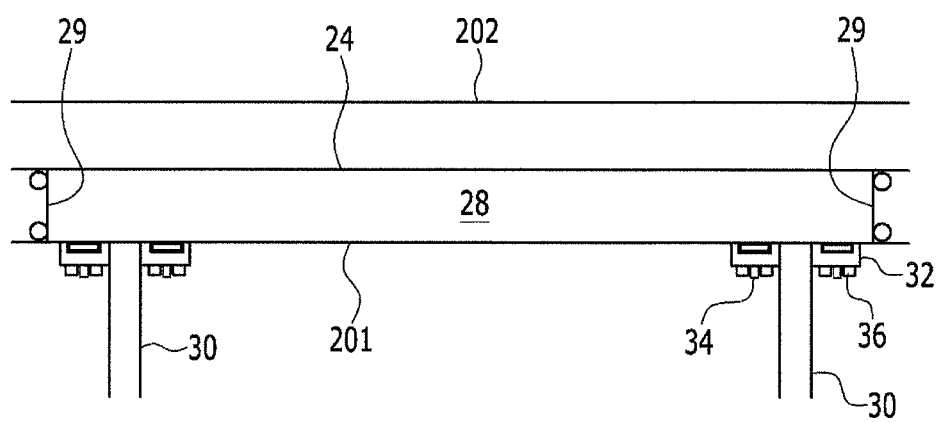
FIG. 5 is a cross-sectional view taken along a line B-B of FIG. 4.

Referring to FIG. 5, two ports communicate with the flow path 28 may be formed in the inside surface 201 of the front side member 20.

One of two port may have a function of an inflow port injecting a coolant to the flow path 28, and the other port may have a function of an outflow outflowing the coolant from the flow path 28.

A coolant pipe 30 may be connected to each port for the inflow and the outflow of the coolant.

A flange 32 may be integrally or monolithically provided in the front portion of the coolant pipe 30, and an assemble bolt 34 is adhered to the inside surface 201 of the front side member 20 by a method including a welding, the flange 32 of the coolant pipe 30 may be inserted to the assemble bolt 34 to be assembled into the nut 36.

When connecting the coolant pipe 30 to the front side member 20, to maintain an air-tightness, an appropriate sealing part may be used.

Accordingly, the coolant inflows to the flow path 28 of the front side member 20 through one coolant pipe 30, flows along the flow path 28, and then outflows through the other coolant pipe 30, being circulated along the coolant cycle.

On the other hand, a partition 29 limiting the flow of the coolant inflowing through the coolant pipe 30 may be attached to the inside surface 201, the longitudinal rib 24, the upper surface, and the transverse rib 26 at both sides of the flow path 28 by the method including the welding.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front side member of a vehicle having a front side member body disposed at right and left sides along a width direction of the vehicle while being formed to extend along a longitudinal direction of the vehicle and having a closed cross-sectionally formed inside,
    wherein the closed cross-sectionally formed inside is divided by at least one rib, and wherein at least two flow paths that are not communicated with each other are formed,
    wherein a coolant pipe communicating with a flow path among at least two flow paths is connected to the front side member body, and
    wherein a flange is integrally or monolithically provided in a front portion of the coolant pipe and an assemble bolt is inserted to the front side member body, and the flange of the coolant pipe is inserted to the assemble bolt to be assembled to a nut.

2. The front side member of claim 1, wherein
the front side member body is formed of an aluminum material by an extrusion method.

3. The front side member of claim 1, wherein the front side member body includes:
    an inside surface toward an internal to an engine compartment;
    an outside surface toward an outside of the engine compartment;
    an upper surface connecting the inside surface and the outside surface and disposed upward in a height direction thereof; and
    a lower surface connecting the inside surface and the outside surface and disposed downward in a height direction thereof.

4. The front side member of claim 3, wherein at least one rib includes:
    a longitudinal rib connecting the upper surface and the lower surface; and
    a transverse rib connecting the inside surface and the outside surface.

5. The front side member of claim 1, wherein
the closed cross-sectionally formed inside is formed of a square shape.

6. The front side member of claim 4, wherein
the longitudinal rib and the transverse rib are crossed to each other.

7. The front side member of claim 4, wherein
four flow paths of which the at least two flow paths are not communicated with each other are formed within the closed cross-sectionally formed inside by the longitudinal rib and the transverse rib.

8. The front side member of claim 7, wherein
at least one port communicating with the flow path among the four flow paths is formed in the inside surface.

9. The front side member of claim 8, wherein
the coolant pipe for an inflow and outflow of a coolant is connected to the at least one port.

10. The front side member of claim 9, wherein
a partition limiting a flow of the coolant inflowing through the coolant pipe is attached to the inside surface, the longitudinal rib, the upper surface, and the transverse rib at a first side and a second side of the flow path.

* * * * *